March 14, 1950 C. R. SMITH 2,500,583
ROOFING AND WATERPROOFING MACHINE
Filed Aug. 27, 1945 3 Sheets-Sheet 1

Inventor:
Charles R. Smith.
by H.J. Sanders
Attorney

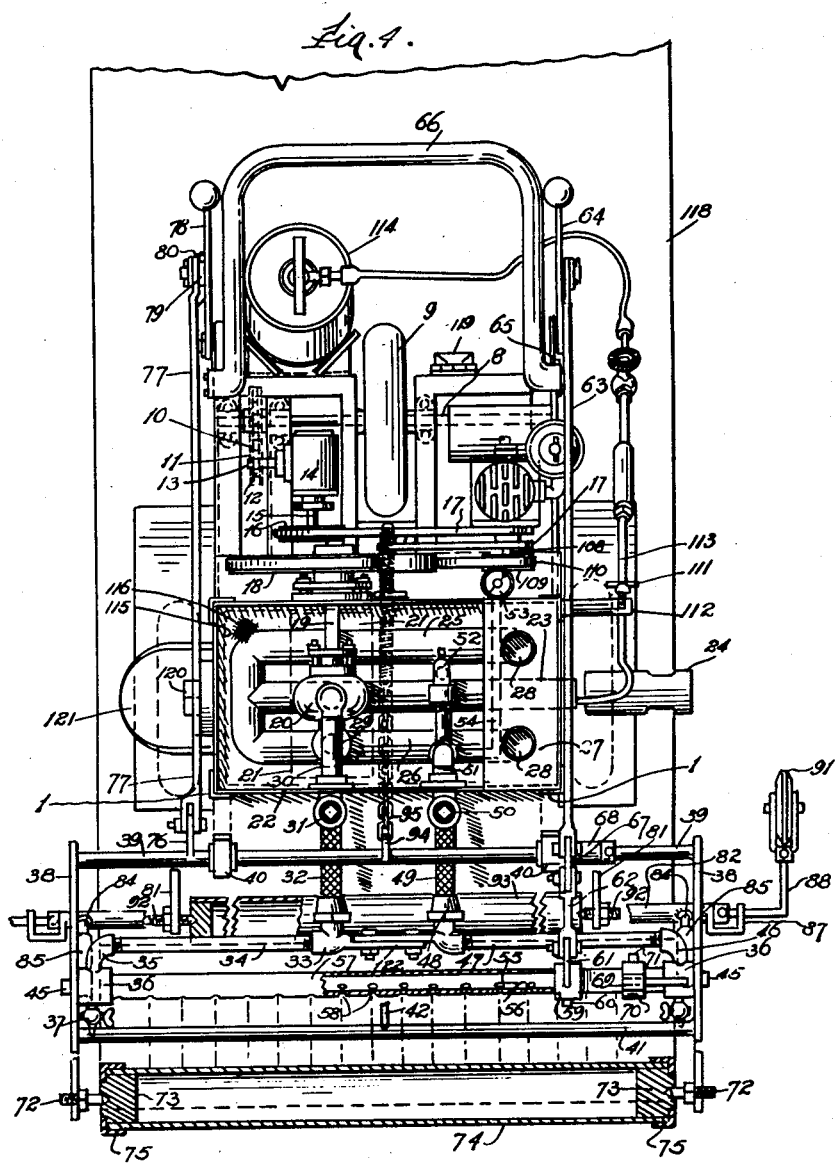

March 14, 1950          C. R. SMITH          2,500,583
ROOFING AND WATERPROOFING MACHINE
Filed Aug. 27, 1945          3 Sheets-Sheet 3
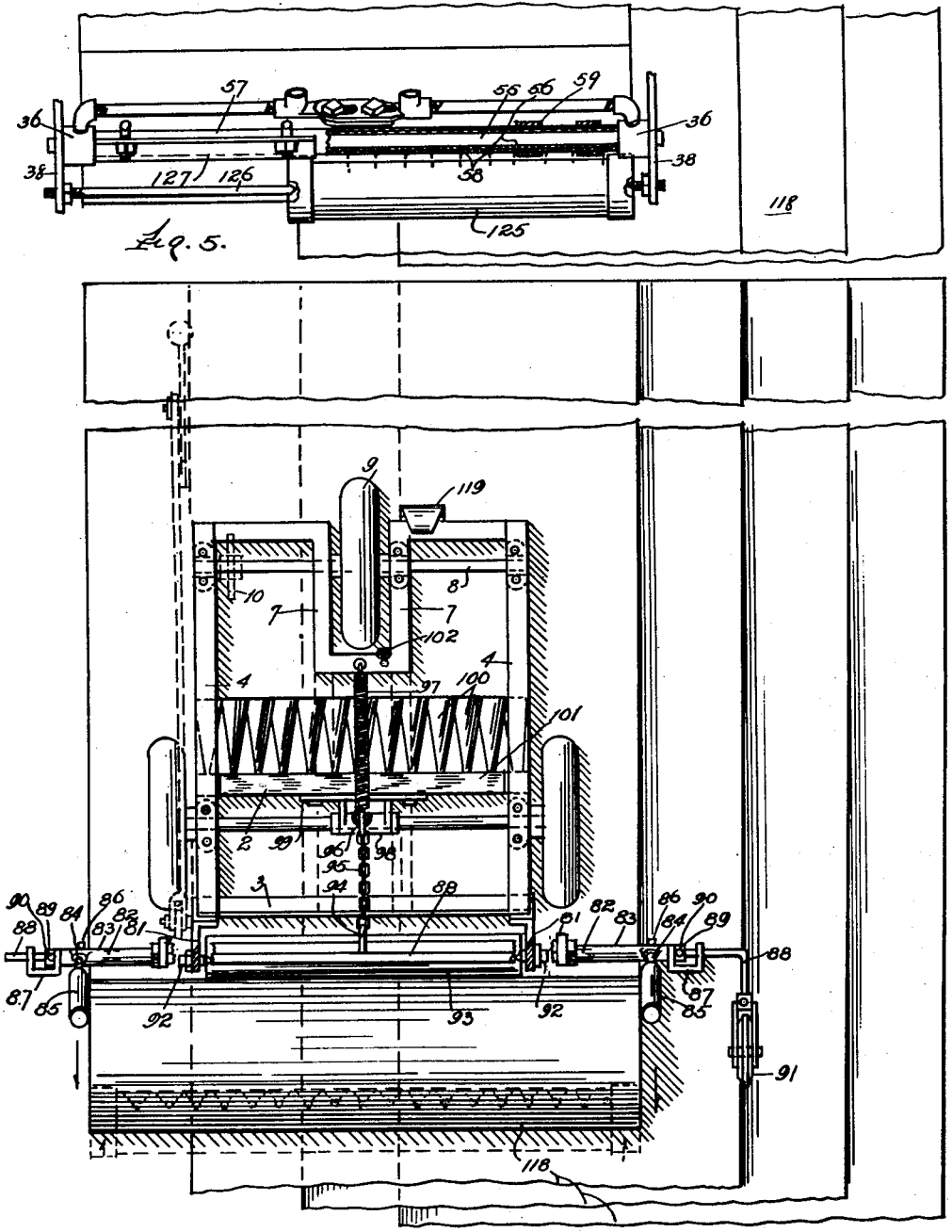
Inventor.
Charles R. Smith
by H. J. Sanders
Attorney.

Patented Mar. 14, 1950

2,500,583

UNITED STATES PATENT OFFICE 2,500,583

ROOFING AND WATERPROOFING MACHINE

Charles R. Smith, Chicago, Ill.

Application August 27, 1945, Serial No. 612,943

5 Claims. (Cl. 216—20)

This invention relates to improvements in roofing and waterproofing machines and more particularly to a machine designed for laying and tarring felt for build-up roofing. A principal object is to provide a roofing machine that is very fast in operation, very efficient and thorough in use and that completes its work with one operation and at walking speed.

A further object is to provide a roofing machine of very simple construction, that is easy to operate, absolutely safe and "foolproof" in use, comparatively inexpensive to manufacture, that is compact in assembly, composed of few parts all of which are readily accessible for adjustment, cleaning, repair or replacement.

A still further object is to provide a machine that will readily apply felt evenly and accurately to a surface, whether level or on a slant or angle; and that will apply the mixture evenly and at any thickness desired, that is adapted for use in overlapping or where it is desired to apply the hot material to but a portion of the felt being laid.

A still further object is to apply the hot material to the felt in a continuous manner and at an even temperature throughout without any possibility of missing spots or small areas or of oversupplying at any place, and this regardless of the condition or temperature of the atmosphere or the viscosity of the material.

A further object is to provide a roofing and waterproofing machine wherein the hot material is maintained in a constant state of circulation under pressure thus making it possible to apply it at any desired temperature which will be that of the kettle. A further object is to provide a roofing machine designed to apply the hot material to the exposed surface of the felt roll whereupon this surface is instantly applied to the roof and "broomed," thus effecting a perfect bond between the layers of felt and greatly reducing the escape of the vapors and essential oils so necessary to the long life of the roof and that are ordinarily lost in very great part through the old and well known mopping method.

A further object is to provide a roofing machine that is very easily started, stopped and guided, that is motor operated and one wherein a traction wheel is used as a brake when the motor is not in operation to hold the machine positively in a set position. With the foregoing and other objects in view the invention consists in the combination and arrangement of parts to be hereinafter fully described, pointed out in the claims and illustrated in the accompanying drawings that form a part of this patent, and in which:

Fig. 4 is a top plan view of the machine, the top or cover of the material reservoir being removed, partly exploded.

Fig. 5 is a fragmentary view showing a shortened distribution roll used when it is desired to apply material to a portion only of the felt roll, and, Fig. 6 is a top plan view with certain parts omitted to show the felt laying and broom mechanism.

Like reference characters denote corresponding parts throughout the several views.

Figure 1:
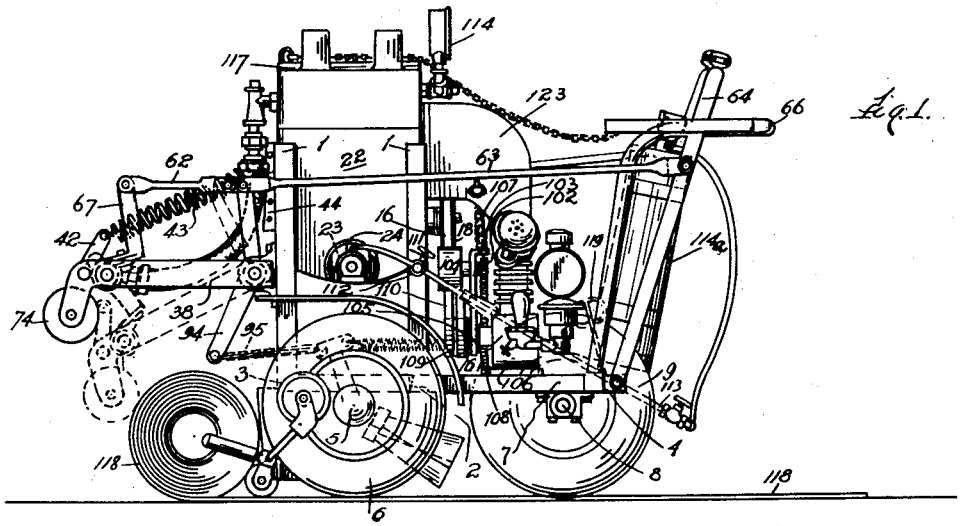
Fig. 1 is a view of the machine in side elevation, certain parts being shown in two positions.
Figure 2:
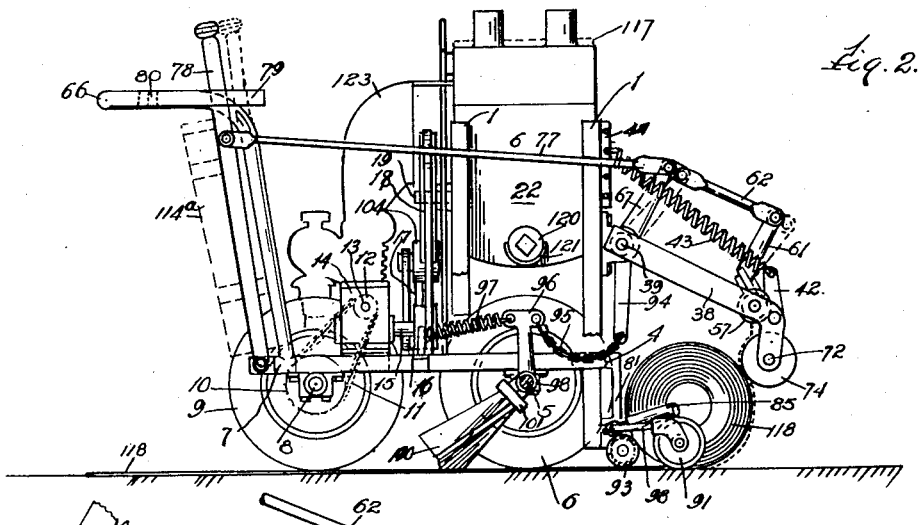
Fig. 2 is a side view of the machine turned half way around and with certain parts in an altered position.
Figure 3:
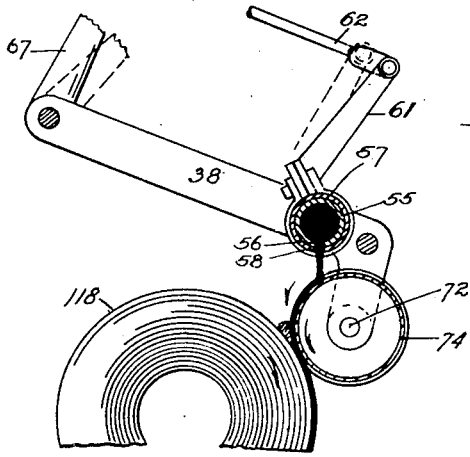
Fig. 3 is an enlarged fragmentary sectional view of the tar supplying mechanism.

The machine includes a wheeled frame having angular corner posts 1, preferably four in number connected by a rear angle 2, front angle 3 and side bars 4. The posts or legs 1 terminate above the ground line, the rear posts rising from the rear angle 2 while the front posts extend below said front angle but clear the ground. Operatively supported in brackets bolted to the under side of the side bars is the axle 5 having upon its ends the supporting wheels 6, two in number, provided preferably with pneumatic tires.

Extending rearwardly from the rear angle 2 substantially in line with the side bars are the rails 7 forming the sides of an auxiliary frame and carrying bearings for the ends of the axle 8 of the traction wheel 9 fast upon said axle. Also fast upon said axle is a sprocket wheel 10 connected by sprocket chain 11 to the pinion 12 fast upon shaft 13 supported in gear box 14 housing gear reducing mechanism operatively connecting shaft 13 to the transmission shaft 15 having fast thereon the pulley 16 connected by belt 17 to the motor shaft 108 connected by a pulley 109 and belt 110 to the large pulley 18 fast upon the shaft 19 of pump 20 supported upon bars 21 inside the kettle 22 carried by said posts 1, said bars 21 being secured to the kettle walls. Arranged within said kettle are heating or fire tubes composed of a central tube 23 extending through one end wall of the kettle and opening in short spaced relation to the fuel burner 24, said tube 23 being spaced slightly above the bottom of said kettle and extending from one kettle end wall almost the length of the kettle and there branching out to form the two parallel return lateral tubes 25, 26 that finally turn upwardly and extend through the kettle part-closure 27 and terminate atop same to form exhausts 28. Within said kettle said tubes are supported by bars 21 aforesaid.

The depth of the kettle is such that when filled the fire tubes as well as the pump may be fully submerged in the material and the material level is kept at such point as to insure the tubes being submerged at all times while the machine is in use, although the pump need not be. The pump is provided with a downturned screened intake pipe 29 the lower open termination of which is spaced a slight distance above the bottom of the kettle so that material at a low level may be drawn in by the pump and forced upwardly through the distribution pipe 30 that curves forwardly and through the wall of the kettle and therebeyond is connected by coupling 31 to the flexible conduit 32 connected by elbow 33 to the pipe link 34 connected by elbow 35 to a hollow threaded fitting 36 having a drain cock 37.

Fitting 36 is supported in one side of an angular frame, the sides 38, 38 thereof being connected by the rod 39 journaled in bearings 40 carried by said posts 1. A brace bar 41 also connects said frame sides 38, 38 and centrally carries a lug 42 connected by stout contractile spring 43 to the perforated portions of an angle bar 44 secured to the kettle, the forward end of said frame being downturned. Likewise secured to a frameside 38 by nut 45 is a hollow fitting 36, also having a drain cock, connected by elbow 46 to a pipe link 47 connected by elbow 48 to flexible conduit 49 connected by coupling 50 to return pipe 51 that extends through the front wall of the kettle and terminates inside same where it is provided with a pressure relief valve 52, a pressure gauge 53 outside and slightly above the kettle being connected to said return pipe by gauge tube 54. Adjustable links 122 releasably connect elbows 33, 46 together.

Referring again to said fittings 36, 36 an inner tube 55 threaded at its inner ends is screwed thereinto and formed longitudinally with a plurality of perforations 56, said tube being telescopically received within an outer tube 57 likewise formed with similar perforations 58, said outer tube extending from fitting to fitting, spaced only sufficiently to allow for possible expansion of the metal. Disposed about said outer tube is a collar 59 releasably locked in adjusted position by set screws 60 and having a handle 61 connected by link 62, upright coupling bar 67 and pitman 63 to a hand lever 64 operable in the yoke 65 carried by the machine handle 66 secured to the auxiliary frame, said bar 67 terminating in a sleeve 68 freely received upon the said rod 39, said lever 64 being fulcrumed to one side of said auxiliary frame.

By moving the lever 64 said outer tube 57 is partially rotated upon said inner tube 55 to cause partial or complete alignment, or total disalignment, of the perforations of said inner and outer tubes. An indicator 69 carried by a clamp 70 encircling said outer tube is secured by screw 71 in adjusted position, said clamp being adjusted to position said indicator at greater or less distance from the said elbow 46 thereby denoting the relative positions of said outer and inner tube perforations, that is whether they are in or out of registry wholly or partly, but very little practice enabling an operator to determine visually the message of the indicator.

Secured to the downturned ends of framesides 38, 38 are support screws 72 that engage metal plugs 73 in the ends of the spreader roller 74 pivotally supported and provided with flanged caps 75 at its ends, the flanges of said caps providing added thickness to said tube at their points of engagement therewith, so that said tube is of lesser diameter at points beyond said caps than at such points of engagement. Fast to said rod 39 is an arm 76 pivotally connected by pitman 77 to the frame control lever 78 fulcrumed to one side of said auxiliary frame, said lever 78 being movable in a yoke 79 provided with a beveled keeper 80 releasably retaining said lever in one position with frame 38, 38 in fully raised position.

Secured to the forward posts 1, 1 are the forwardly extending brackets 81, 81 to which is secured the tube 82 extending beyond said brackets and upon its outer ends freely receiving sleeves 83 carrying posts 84 upon which are received rotary guide sleeves 85, ball bearing, suitably retained thereto, said sleeves 83 being secured to said tube 82 in adjusted positions by set screws 86. Secured to each sleeve 83 is an U-shaped bracket 87 through a perforation in which an angular rod 88 extends into said tube 82, said rod 88 being provided with a collar 89 and set screw 90 whereby it may be locked in an adjusted position, a guide wheel 91 carried at the free end of said rod 88 for spacing the layers of felt apart as they are laid, said angular rod 88 being adapted for insertion in either end of said tube 82 and being adapted for right or left side use.

Also carried in said brackets 81 are screws 92 that pivotally carry a follower roller 93 disposed immediately in advance of said tube 82 of materially larger diameter than said tube for engagement with the roll of felt. Referring again to said rod 39 same has fast thereon a drop bar 94 connected by chain 95 to a T-bar 96 fast to and rising from a sleeve 98 free on said axle 5, said T-bar being connected by the contractile coil spring 97 to the auxiliary frame, said sleeve 98 having ears directly connected to or part of a bracket 99 carrying a broom 101 provided with the bristle heads 100, said broom being disposed immediately below said auxiliary frame and designed for pivotal movement toward and away from the ground line, said spring 97 imposing a tension on said broom for yieldingly pressing same downwardly, said broom being raised by rearward manual movement of levers 64, 78, the latter rotating rod 39. Also secured to said auxiliary frame at a point near that engaged by spring 97 is a contractile coil spring 102 connected at its upper end to the angled end of a lever 103 that carries a tension roller 104 engaging said belt 17, said lever being fulcrumed to pin 105 carried by the frame of the motor 106, this forming a clutch assembly.

Referring again to said lever 103 same is engaged by or carries at its upper end a loose chain 107 having a small ring at its end by means of which it may be manually moved against the tension of spring 102 toward pitman 63 to remove tension roller 104 from engagement with belt 17 thus permitting the motor to run idle, as when cold or starting, the ringed end of said chain then being secured to the threaded pin 111 removably carried by the tubular post 112 carried by the kettle and extending outwardly therefrom and being slotted to releasably receive the fuel line 113 running from the fuel tank 114a to the said burner 24, said fuel line being flexible at least in part and being releasably retained in the slotted portion of said post 112 by said threaded pin. A kettle temperature gauge 114 is provided upon one exterior face thereof that registers the temperature of the material in the kettle.

The open top of the tank is formed with an inner flange or ledge 115 that receives the frame of a removable screen 116 for filtering the material poured into the kettle, said top being provided with a hinged cover 117. The roll of roofing felt 118 is disposed upon the roof with a short portion unrolled, the ends of the roll coming between the guide sleeves 85 which rotate upon ball bearings about their supports and prevent lateral movement of the roll which is engaged by the follower or impeller roller 93 propelling the felt roll forward and unrolling same as the machine is moved forwardly. Hinged to the auxiliary frame beside the traction wheel 9 is the leg 119 of greater length than the distance between the wheel axis and the ground line and when the machine is moved forwardly by said traction wheel said leg follows, dragging. When the traction wheel is not impelling the machine, however, the frame may be tilted forwardly by its handle to raise wheel 9 above the ground and at such time the leg will swing forwardly into vertical position when it will support this end of the machine. One end of the kettle is provided with a screw plug 120 threaded into the kettle wall and which is manually removed to permit cleaning of the kettle, the dregs, residue and any liquid draining out through the plug opening and being conveyed by the drainway 121 to a suitable container. A hood 123 is removably secured to the rear wall of the kettle to shield certain movable parts in operation.

In operation, fill the kettle through the strainer with hot material such as coal tar or pitch until the pump is submerged. Then light the fuel burner and preheat the spreader roller and dispensing tubes by applying the burner thereto briefly until their temperature is raised substantially to that of the material in the kettle. The burner is now replaced in engagement with the flame tubes. The traction wheel is then raised to permit use of the hinged leg to support the frame. The clutch is then released and the pump made inoperative to permit the motor to run free. Now start the motor to run free and warm up.

Now engage the pump clutch so that the pump operates and a circulation of the material is set up in the kettle, through the conveying lines and dispensing tubes and back into the kettle, this circulation being maintained continuously during the operation of the machine. This circulation will loosen, thaw or remove any foreign matter that may have clogged the dispensing tube perforations or the drain cocks while the machine has been inoperative and cold, such material then being carried back into the kettle. The machine is now manually moved to a position back of the felt roll upon the free end of same. The traction wheel is now running idle in an above the ground line position. Now disengage the hand lever 64 from its keeper and permit frame 38 to gravitate downwardly to engage the spreader roller with the roll of felt, the flanged caps directly engaging the felt roll and spacing the spreader roller slightly therefrom. Lever 64 is now moved to position the outer dispensing tube operatively relative to the inner tube to permit the escape of the hot material to be forced against the spreader roller and thereby applied direct to the roll of felt. At the moment this liquid application begins the machine is pushed off the leg upon the traction wheel which then operates, motor driven, to propel the machine forwardly. The quantity of material fed from the dispensing tubes may be regulated by adjustment of said tubes, adjustment of the well known pressure valve and adjustment of spring 43 to determine the thickness of the layer of applied material. The machine is readily guided by its handle.

It will be noted that the guide sleeves 85 are to be adjusted to short spaced relation to the ends of the roll, the roll being received therebetween and prevented from moving laterally thereby from its forward course. The spreader roller in operation is disposed partially in advance of and partially above the top of the felt roll so that it forms a barrier to prevent escape of the roll on an incline away from the machine.

The spring 43 can be adjusted to vary the weight of the material-applying mechanism upon the felt roll, this weight preventing the formation of slack in the felt roll as it is moved over a surface, the felt being kept taut at all times thus avoiding wrinkles forming in the felt which would form air pockets resulting in faults in the roof.

In place of the full size spreader roller 74 a shortened spreader roller 125 may be employed which is connected by rod 126 to the frame, said roller 125 being shorter than the width of the felt roll and spreading material over but part of the same, the dispensing tubes having their perforations closed by a shield 127, semi-circular in cross section, clamped to that portion of the dispensing tubes beyond said shortened spreader roller. The amount of hot material fed by the dispensing tubes against the spreader roller is sufficient to form a slight "pool" or reservoir of material at the point where the spreader roller and felt roll meet thus insuring the elimination of air from the material as it is spread upon the roll.

What is claimed is:

1. In a rolled felt laying machine, a kettle, a gravity controlled frame carried thereby, liquid dispensing means carried by said frame, liquid conveying means connecting said kettle and dispensing means, means for continuously circulating the liquid through said kettle, conveying and dispensing means under pressure; a roll engaging spreader carried by said frame movable into and out of liquid-receiving roll-engaging position for uniformly spreading the liquid upon the roll in one position, the roll-engaging position of said spreader being normally retained through gravity as the rolled felt is unrolled, and manually operable means for moving said liquid dispensing means and spreader against gravity out of operative association with each other and with the roll.

2. In a rolled felt laying machine, a kettle, liquid dispensing means associated therewith, liquid conveying means connecting said kettle and dispensing means, means for continuously circulating the liquid through said kettle, conveying and dispensing means under pressure; a spreader, flanged caps therefor normally engaging the felt roll and spacing said spreader therefrom, a gravity actuated frame carried by said kettle supporting said liquid dispensing means and said spreader, and actuating means for said frame for moving same toward and away from the roll.

3. In a felt laying machine, a wheeled frame, a roll impeller carried thereby, roll guides adjustably carried by said frame, and an adjustable guide wheel carried by said frame.

4. In a felt laying machine, a wheeled frame, a broom adjustably carried thereby, liquid dispensing means adjustably carried by said frame, and means connecting said dispensing means and broom for adjusting the latter simultaneously with said dispensing means.

5. In a felt laying machine, a tilting frame, support wheels therefor, a motor, a traction wheel for said frame for ground engagement in one position of said frame, connection between said traction wheel and motor, and a leg hinged to said frame movable through gravity to frame-supporting position when said frame is tilted to raise said traction wheel clear of the ground.

CHARLES R. SMITH.

REFERENCES CITED

The following references are of record in the file of this patent:

UNITED STATES PATENTS

| Number | Name | Date |
|---|---|---|
| 166,296 | Perry | Aug. 5, 1875 |
| 703,327 | White | June 24, 1902 |
| 905,190 | Ingersoll | Dec. 1, 1908 |
| 1,124,407 | Finley | Jan. 12, 1915 |
| 1,188,810 | Mitchell | June 27, 1916 |
| 1,433,713 | Fricker | Oct. 31, 1922 |
| 1,751,452 | Streitman | Mar. 18, 1930 |
| 1,755,376 | Thompson | Apr. 22, 1930 |
| 1,759,920 | Talbott | May 27, 1930 |
| 1,778,551 | Entyre | Oct. 14, 1930 |